(12) United States Patent
Hirai et al.

(10) Patent No.: US 11,273,896 B2
(45) Date of Patent: Mar. 15, 2022

(54) SHAPE HOLDING FIXTURE AND METHOD FOR MANUFACTURING AIRCRAFT PANEL

(71) Applicant: MITSUBISHI HEAVY INDUSTRIES, LTD., Tokyo (JP)

(72) Inventors: Makoto Hirai, Tokyo (JP); Hiroki Azuma, Tokyo (JP); Takuya Goto, Tokyo (JP); Sachio Takeyama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 898 days.

(21) Appl. No.: 16/074,206

(22) PCT Filed: Nov. 17, 2016

(86) PCT No.: PCT/JP2016/084128
§ 371 (c)(1),
(2) Date: Jul. 31, 2018

(87) PCT Pub. No.: WO2017/134901
PCT Pub. Date: Aug. 10, 2017

(65) Prior Publication Data
US 2021/0171181 A1    Jun. 10, 2021

(30) Foreign Application Priority Data

Feb. 2, 2016 (JP) .............................. JP2016-018426

(51) Int. Cl.
| | | |
|---|---|---|
| *B64C 1/12* | (2006.01) | |
| *B64F 5/10* | (2017.01) | |
| *B25B 11/00* | (2006.01) | |
| *B21J 15/14* | (2006.01) | |

(Continued)

(52) U.S. Cl.
CPC .............. *B64C 1/12* (2013.01); *B25B 11/005* (2013.01); *B64F 5/10* (2017.01); *B21J 15/142* (2013.01);
(Continued)

(58) Field of Classification Search
CPC ...... B21J 15/142; B21J 15/42; B23P 2700/00; B23P 2700/01; B23Q 2240/00;
(Continued)

(56) References Cited

U.S. PATENT DOCUMENTS 6,121,781 A * 9/2000 Martinez .................. B21J 15/10
 324/658
6,333,572 B1   12/2001 Ono
(Continued)

FOREIGN PATENT DOCUMENTS

| | | |
|---|---|---|
| JP | H10-256355 A | 9/1998 |
| JP | 2006-247757 A | 9/2006 |

(Continued)

OTHER PUBLICATIONS

Partial Supplementary European Search Report for European Application No. 16889384.0 dated Apr. 2, 2019; 11pp.

(Continued)

*Primary Examiner* — Tyrone V Hall, Jr.
(74) *Attorney, Agent, or Firm* — Kanesaka Berner and Partners LLP

(57) ABSTRACT

To simplify the structure of a holding fixture which holds the shape of the aircraft panel and conveys the aircraft panel, an object is to ensure shape accuracy required in the manufacturing process and hold an aircraft panel in an appropriate shape, in combination with a holding fixture. A shape holding fixture includes: a plurality of support units configured to be positioned on a lower surface side of an aircraft panel, and provided at intervals along a one-axis direction, (Continued)

the aircraft panel being held by a holding fixture configured to grip an edge portion of the aircraft panel; and a shape holding unit provided to each of the plurality of support units, including a rod which supports the aircraft panel from the lower surface side of the aircraft panel, and configured to adjust a position where the rod comes into contact with the aircraft panel to support the aircraft panel, corresponding to the shape of the aircraft panel.

1 Claim, 13 Drawing Sheets

(51) Int. Cl.
    *B64C 1/06*     (2006.01)
    *B64C 1/00*     (2006.01)

(52) U.S. Cl.
    CPC .............. *B64C 1/061* (2013.01); *B64C 1/064* (2013.01); *B64C 2001/0054* (2013.01)

(58) Field of Classification Search
    CPC ........ B23Q 2240/005; B23Q 2240/002; B23Q 2240/007; B23Q 3/02; B23Q 3/06; B23Q 3/062; B23Q 3/065; B23Q 3/18; B23Q 3/082; B25B 11/005; B25B 11/00; B25B 5/006; B25B 5/003; B64C 1/12; Y10T 29/49895; Y10T 29/49899; Y10T 29/49902; Y10T 29/49828; Y10T 29/49829; Y10T 29/49943; Y10T 29/49947; Y10T 29/49954; Y10T 29/49956

See application file for complete search history.

(56) References Cited

U.S. PATENT DOCUMENTS

| | | | |
|---|---|---|---|
| 6,418,602 B2 * | 7/2002 | Crocker | ................... B21J 15/10 |
| | | | 29/281.4 |
| 7,168,898 B2 * | 1/2007 | Hamann | ................ B23Q 1/035 |
| | | | 269/21 |

FOREIGN PATENT DOCUMENTS

| | | |
|---|---|---|
| JP | 2008-7114 A | 1/2008 |
| JP | 2013-198918 A | 10/2013 |
| JP | 2015-30348 A | 2/2015 |
| WO | 97/34733 A1 | 9/1997 |
| WO | 97/34734 A1 | 9/1997 |

OTHER PUBLICATIONS

"A story toward making a jumbo jet airliner Boeing "777" [in Gifu works/ Nagoya Works 1]Make a fuselage panel", Kawasaki News, Kawasaki Heavy Industries, Ltd., Publication Office, Apr. 2005, No. 138, pp. 1-7, 5pp.

International Search Report and Written Opinion for PCT/JP2016/ 084128, dated Feb. 7, 2017, 16 pp.

* cited by examiner

SHAPE HOLDING FIXTURE AND METHOD FOR MANUFACTURING AIRCRAFT PANEL

RELATED APPLICATIONS

The present application is a National Phase of PCT/JP2016/084128 filed Nov. 17, 2016 and claims priority to Japanese Patent Application Number 2016-018426 filed Feb. 2, 2016.

TECHNICAL FIELD

The present invention relates to a shape holding fixture and a method for manufacturing an aircraft panel.

BACKGROUND ART

A fuselage panel of an aircraft is formed by combining: plate-like skins having a curved surface; long stringers which are mounted on the skins along a longitudinal direction of a fuselage; frames which are mounted along a circumferential direction of a fuselage; and other elements.

Joining of overlapping portions of skins disposed adjacent to each other and joining of the frames with respect to the skin or the stringer is performed after the position of respective components is accurately determined using a positioning fixture. Rivets are used for joining the components. With the use of the positioning fixture, the respective components can be joined to the skin having low rigidity at an accurate position.

Conventionally, the positioning fixtures are used in a fixed state at predetermined positions in a plant and hence, the above-mentioned joining of the skins and joining of the frames are performed at the predetermined positions so as to manufacture a fuselage panel. The fuselage panel during manufacture is removed from the positioning fixture and is moved when the fuselage panel is moved from a work location in one step to a work location in a next step. The positioning fixtures per se are not moved.

CITATION LIST

Non Patent Literature

[NPL 1] "A story toward making a jumbo jet airliner Boeing "777" (1) [in Gifu Works/Nagoya Works 1] Make a fuselage panel", Kawasaki News, Kawasaki Heavy Industries, Ltd. Public Relations Office, April 2005, No. 138, p. 1-7

SUMMARY OF INVENTION

Technical Problem

A positioning fixture used in a fixed state at a predetermined position is prepared in advance conforming to the shape of a fuselage panel to be manufactured. The fuselage panel is not limited to have a single curved surface where the longitudinal direction extends in a straight line, but may have a double curved surface also having a curvature in the longitudinal direction. Accordingly, it is necessary to prepare a variety of positioning fixtures conforming to the shape of the fuselage panels thus increasing cost for preparation and management of the fixtures.

In performing a rivet fastening operation in the manufacturing process for manufacturing a fuselage panel, joining of overlapping portions of skins disposed adjacent to each other and joining of the frame with respect to the skin or the stringer are manually performed by riveting. Recently, an automatic riveting machine is also adopted in these steps. However, in riveting to a panel fixed to the positioning fixture, there may be a case where the automatic riveting machine interferes with a support member of the positioning fixture which supports the panel. Accordingly, the range where the automatic riveting machine is applicable is limited.

For example, the structure of the fixture which supports a fuselage panel may be simplified by omitting a portion of the support member of the positioning fixture. Simplifying the structure of the fixture can expand the range where the automatic riveting machine is applicable. However, when skins, which are plate-like members forming the fuselage panel, are made to overlap each other, high shape accuracy is required even though rigidity of the skins is low.

Accordingly, it is difficult for a fixture having a simplified structure to hold a fuselage panel while ensuring shape accuracy of the fuselage panel.

The present invention has been made under such circumstance. In order to simplify the structure of a holding fixture which holds the shape of the aircraft panel and conveys the aircraft panel, the present invention is directed to providing a shape holding fixture and a method for manufacturing an aircraft panel, in combination with a holding fixture, which can ensure shape accuracy required in the manufacturing process and can hold an aircraft panel in an appropriate shape.

Solution to Problem

A shape holding fixture according to a first aspect of the present invention includes: a plurality of support units configured to be positioned on a lower surface side of an aircraft panel including a plate-like member, and provided at intervals along the one-axis direction, the aircraft panel being held by a holding fixture configured to grip an edge portion of the aircraft panel; and a shape holding unit provided to each of the plurality of support units, including a rod which supports the aircraft panel from the lower surface side of the aircraft panel, and configured to adjust a position where the rod comes into contact with the aircraft panel to support the aircraft panel, conforming to a shape of the aircraft panel.

In the above-mentioned first aspect, the shape holding fixture may further include a first adjusting unit configured to move each of the support units in a direction parallel to the one-axis direction so as to adjust an installation position of each of the support units.

In the above-mentioned first aspect, the shape holding fixture may further include a second adjusting unit provided to each of the support units, and configured to adjust a position of the rod in a direction perpendicular to the one-axis direction in a plane perpendicular to the one-axis direction of the aircraft panel.

In the above-mentioned first aspect, the shape holding fixture may further include a third adjusting unit provided to each of the support units, and configured to adjust the position of the rod conforming to a curved shape of the aircraft panel in a plane perpendicular to the one-axis direction of the aircraft panel.

In the above-mentioned first aspect, the shape holding fixture may further include a fourth adjusting unit configured to move each of the support units in a height direction in a plane perpendicular to the one-axis direction so as to adjust the installation position of each of the support units.

In the above-mentioned first aspect, the shape holding fixture may further include a fifth adjusting unit configured to move each of the support units in a plane perpendicular to the one-axis direction in the direction perpendicular to the one-axis direction and in a horizontal plane parallel to an installation surface so as to adjust the installation position of each of the support units.

In the above-mentioned first aspect, the shape holding fixture may further include: a laser tracker configured to emit a laser beam to a reflector provided to the rod and configured to receive the laser beam reflected on the reflector so as to detect a position of the reflector; and a control unit configured to adjust a position of the rod based on the position of the reflector detected by the laser tracker.

In the above-mentioned first aspect, in a state where the plate-like member of the aircraft panel has an opening portion, and an opening portion reinforcing member for reinforcing the opening portion is provided to the aircraft panel, a reinforcing portion support member configured to support the opening portion reinforcing member from below may be provided on the plurality of support units.

In the above-mentioned first aspect, the holding fixture includes: a plurality of gripping units configured to grip the aircraft panel at edge portions on two opposite sides of the aircraft panel such that the aircraft panel has a curved shape in cross section taken in a direction perpendicular to the one-axis direction; and a support member configured to integrally support the plurality of gripping units, the support member being provided corresponding to the aircraft panel to be gripped by the plurality of gripping units, wherein the plurality of gripping units hold the aircraft panel such that the gripping units grip the edge portions of the aircraft panel, and the aircraft panel has a curved shape in cross section taken in the direction perpendicular to the one-axis direction, and the holding fixture is configured to be conveyable in a state of holding the aircraft panel.

A method for manufacturing an aircraft panel according to a second aspect of the present invention is a method for manufacturing an aircraft panel including a plate-like member, the method including the steps of: conveying a holding fixture to a position above a shape holding fixture; setting the holding fixture on the shape holding fixture in an overlapping manner; causing a plurality of gripping units provided to the holding fixture to grip an aircraft panel, including the plate-like member, at edge portions on two opposite sides of the aircraft panel on the holding fixture such that the aircraft panel has a curved shape in cross section taken in a direction perpendicular to a one-axis direction; adjusting positions of rods conforming to a shape of the aircraft panel, the rods being provided to a plurality of support units of the shape holding fixture which are arranged at intervals along the one-axis direction; causing the rods to come into contact with the aircraft panel from a lower surface side of the aircraft panel so as to support the aircraft panel; joining an overlapping portion of the aircraft panel by a rivet; and conveying the holding fixture while maintaining a state where the holding fixture holds the edge portions of the aircraft panel.

Advantageous Effects of Invention

According to the present invention, in order to simplify the structure of the holding fixture which holds the shape of the aircraft panel and conveys the aircraft panel, the shape holding fixture is used in combination with the holding fixture to ensure shape accuracy required in the manufacturing process, thus holding the aircraft panel in an appropriate shape.

DESCRIPTION OF EMBODIMENTS

Hereinafter, embodiments according to the present invention are described with reference to drawings.

First Embodiment

A holding fixture according to a first embodiment of the present invention is applied to a fuselage panel manufacturing system where the holding fixture is conveyed on a production line. A conveying track is provided to the fuselage panel manufacturing system, and the holding fixture 1 is moved in one direction along the conveying track. At respective work areas, a rivet fastening operation or the like is performed on the fuselage panel 10 in a state where the holding fixture 1 is fixed. That is, the fuselage panel 10 is fixed during the operation, and is moved only when the fuselage panel 10 is conveyed between work areas. It is unnecessary to change the method for moving the holding fixture 1 and the processing procedure of the holding fixture 1 corresponding to a kind of the fuselage panel 10. Accordingly, a variety of fuselage panels 10 can be manufactured in the same production line.

The holding fixture 1 is used for holding the shape of an aircraft panel in a predetermined shape in joining skins which form the aircraft panel to each other by rivets in an overlapping state, or in joining a frame to the skin or a stringer by rivets, for example.

Hereinafter, the description is made with respect to a method for manufacturing a fuselage panel 10 of an aircraft. However, the present invention is not limited to this embodiment. For example, the present invention is also applicable to a method for manufacturing an aircraft member other than the fuselage panel 10, such as a wing.

Figure 1:
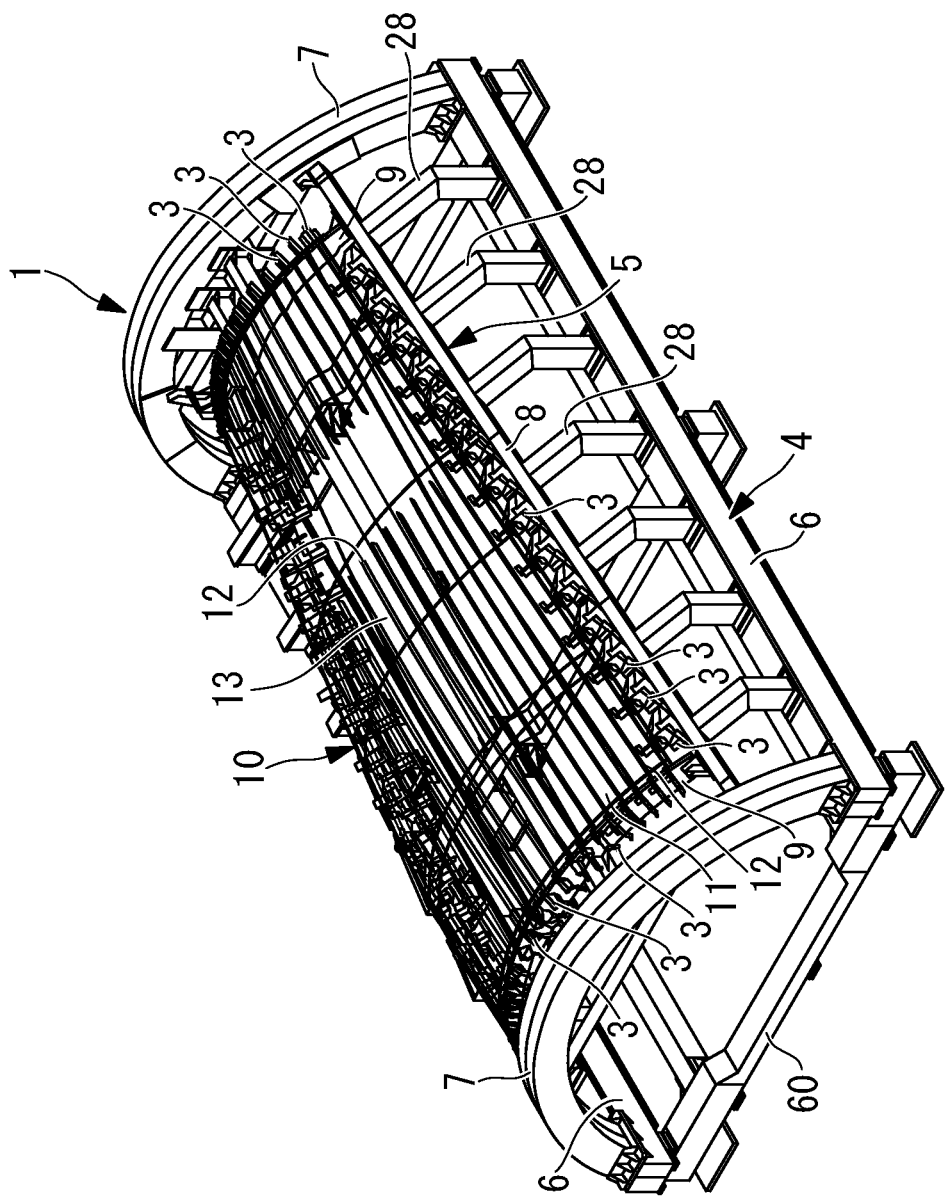
FIG. 1 is a perspective view showing a holding fixture according to a first embodiment of the present invention, a fuselage panel placed on the holding fixture, and a fixing base on which the holding fixture is placed.

As shown in FIG. 1, the fuselage panel 10 of the aircraft is formed by combining: plate-like skins 11 having a curved surface; long stringers 12 which are mounted on the skins 11 along the axial direction (longitudinal direction) of a fuselage; frames (not shown in the drawing) which are mounted along the circumferential direction of the fuselage; and other elements. The fuselage panel 10 is made of aluminum or an aluminum alloy, for example. For one example of size, the length in the longitudinal direction is 10 m, the arc length is 6 m, and the plate thickness is from 2 mm to 5 mm.

In a step where the holding fixture 1 according to this embodiment holds the fuselage panel 10, the fuselage panel 10 has a shape which is obtained by dividing a substantially cylindrical fuselage portion of the aircraft in the axial direction and in the circumferential direction. Accordingly, the fuselage panel 10 has an arc shape in cross section taken in the direction perpendicular to the axial direction. The fuselage panel 10 has two straight opposite sides which extend parallel or oblique to the axial direction, and the two sides are positioned at lower edges of the fuselage panel 10 in a state where the fuselage panel 10 is held by the holding fixture 1. The fuselage panel 10 also has two opposite sides each of which is provided in a plane perpendicular to the axial direction, and the two sides have an arc shape, and are positioned at side edges of the fuselage panel 10 in a state where the fuselage panel 10 is held by the holding fixture 1.

Assume a case where a portion of a fuselage of an aircraft to be manufactured in the axial direction has a single curved surface with a constant curvature along the axial direction. In such a case, each of the plurality of fuselage panels 10 also has a constant curvature along the axial direction.

Figure 3:
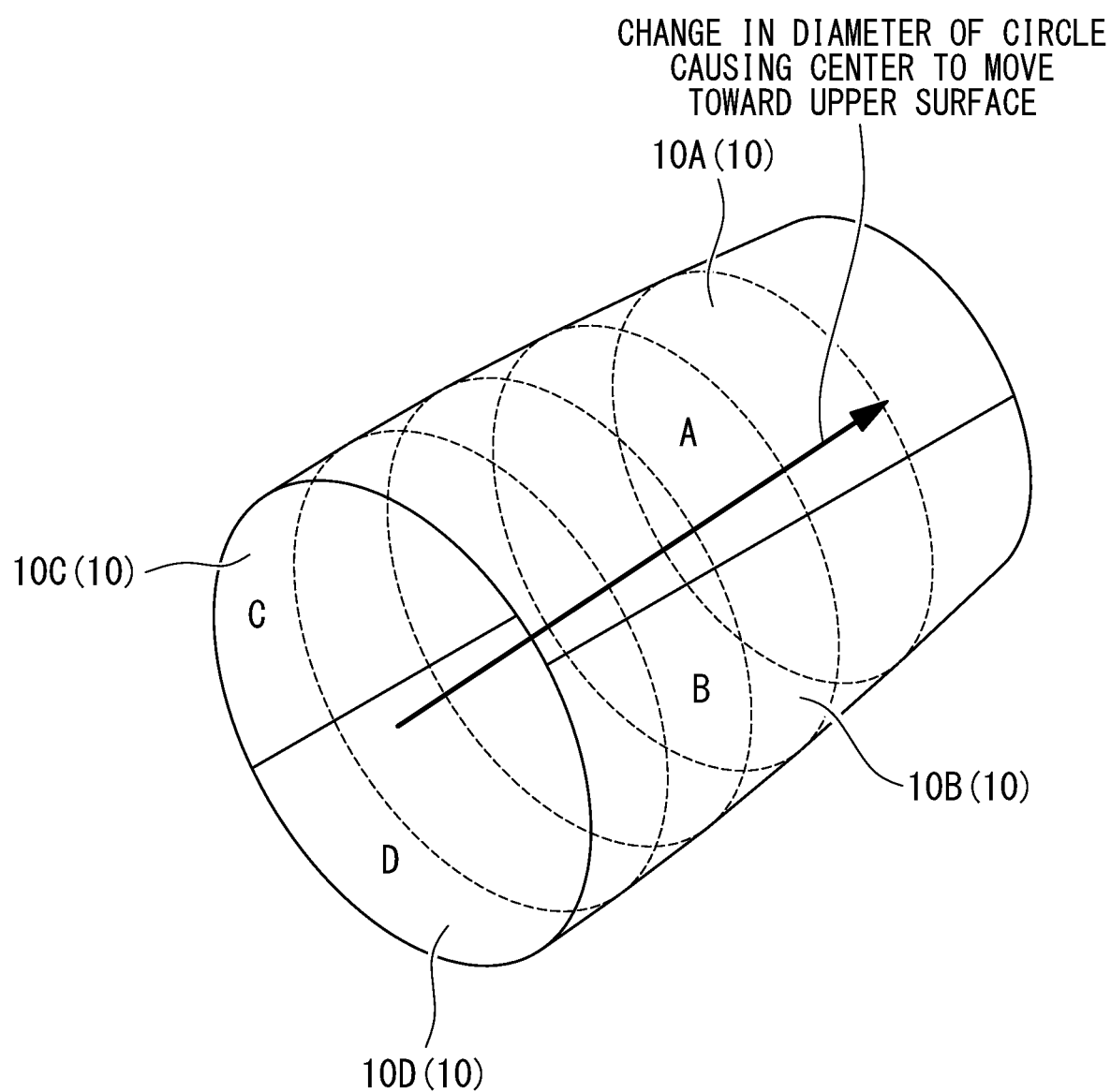
FIG. 3 is a perspective view showing a fuselage of an aircraft.
Figure 4:
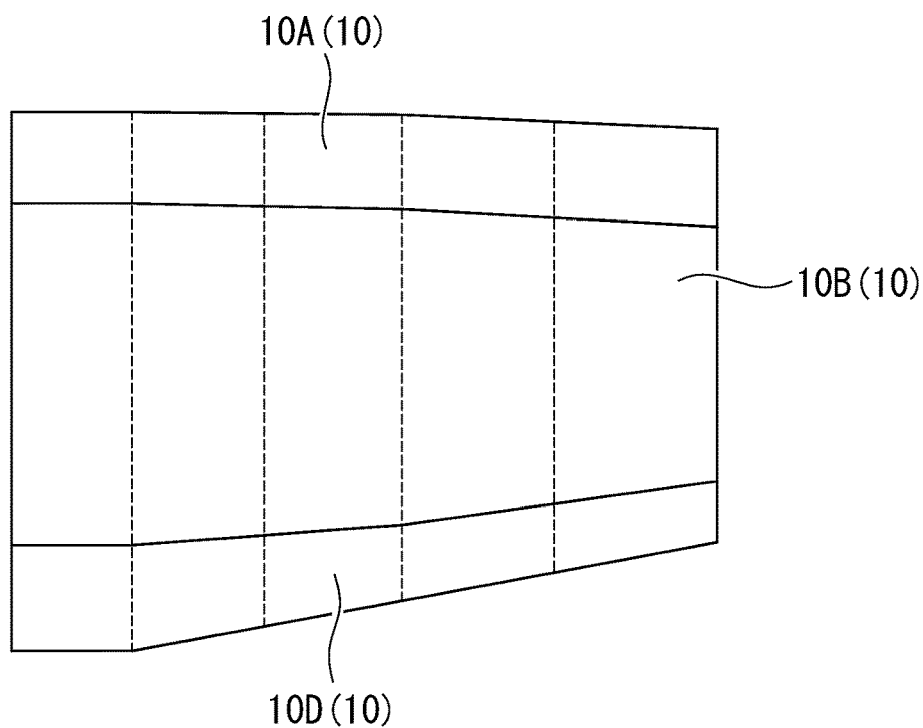
FIG. 4 is a side view showing the fuselage of the aircraft.
Figure 5:
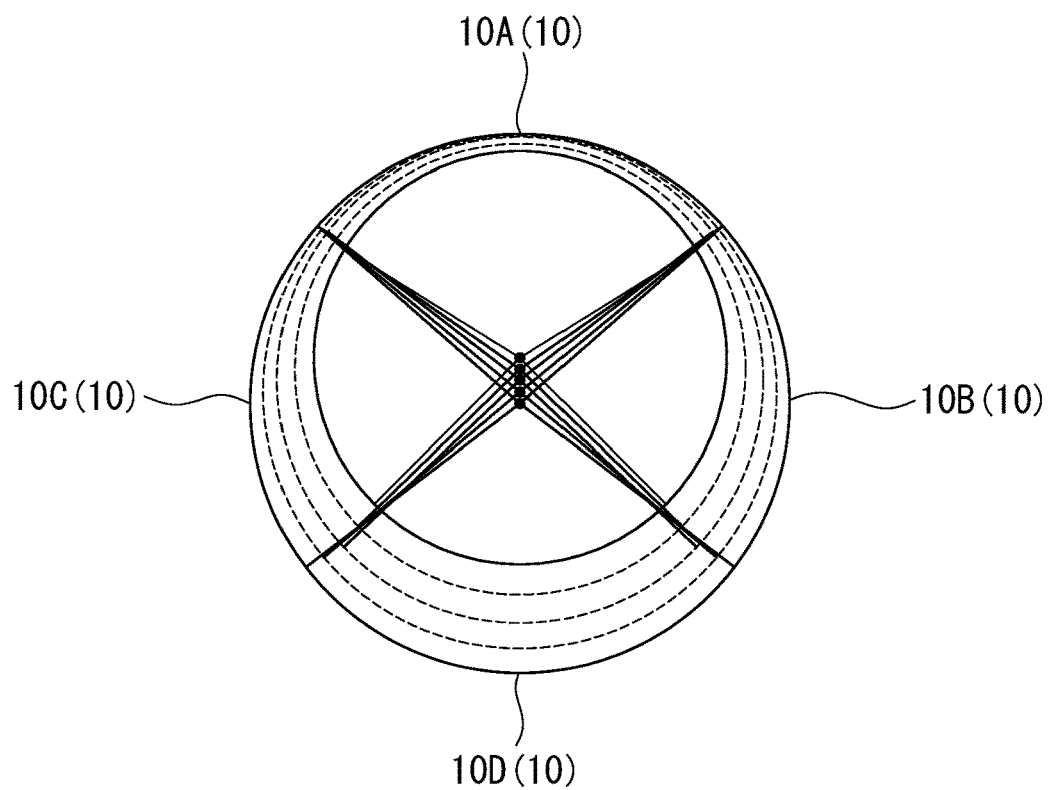
FIG. 5 is a front view showing the fuselage of the aircraft.

On the other hand, assume a case where a portion of a fuselage of an aircraft to be manufactured in the axial direction has a double curved surface with a varying curvature along the axial direction as shown in FIG. 3 to FIG. 5. In such a case, as shown in FIG. 3 to FIG. 5, the plurality of fuselage panels 10 form the portion of the fuselage in combination. In this case, the respective fuselage panels 10 (10A, 10B, 10C, 10D) also vary in curvature along the axial direction. Further, not only the portion of the fuselage vary in curvature along the axial direction, but also the center positions of circles of respective cross sections each of which is taken in the direction perpendicular to the axial direction move toward the upper side of the fuselage along the axial direction. Accordingly, center positions of arcs of cross sections of each fuselage panel 10 also change along the axial direction.

The holding fixture 1 is configured to be conveyable. For example, the holding fixture 1 is placed on a conveying apparatus (not shown in the drawing) which includes a chain conveyor, a belt conveyor or the like, and the holding fixture 1 is conveyed from one end side to the other end side of the conveying apparatus. In the conveying apparatus, a chain, a belt or the like is wound parallel to horizontal members 6 of the holding fixture 1, and the chain, the belt or the like is rotated by driving a motor. The holding fixture 1 is made of aluminum or an aluminum alloy, for example. FIG. 1 shows a state where the holding fixture 1 is fixed to a fixing base 60.

The holding fixture 1 has a shape where a plurality of gripping units 3 are supported by a support member 5 so that the gripping units 3 and the support member 5 are formed into an integral body with a fixed relative position, and bottom portions of the two horizontal members 6 are disposed on the same plane. With such a configuration, the holding fixture 1 can be conveyed by the conveying apparatus.

While the holding fixture 1 is being moved by the conveying apparatus, a rivet fastening operation is not performed on the fuselage panel 10. The rivet fastening operation is performed on the fuselage panel 10 in a state where the holding fixture 1 is fixed at one position. For example, an automatic riveting machine is installed at a predetermined place and, when rivet fastening performed by this automatic riveting machine is completed, the holding fixture 1 is conveyed to another place by the conveying apparatus. At the place to which the holding fixture 1 is conveyed, another automatic riveting machine is installed, and rivet fastening is performed by another automatic riveting machine. Alternatively, the place to which the holding fixture 1 is conveyed is a work location where an operator performs an operation, and rivet fastening, inspection or the like is manually performed.

Figure 2:
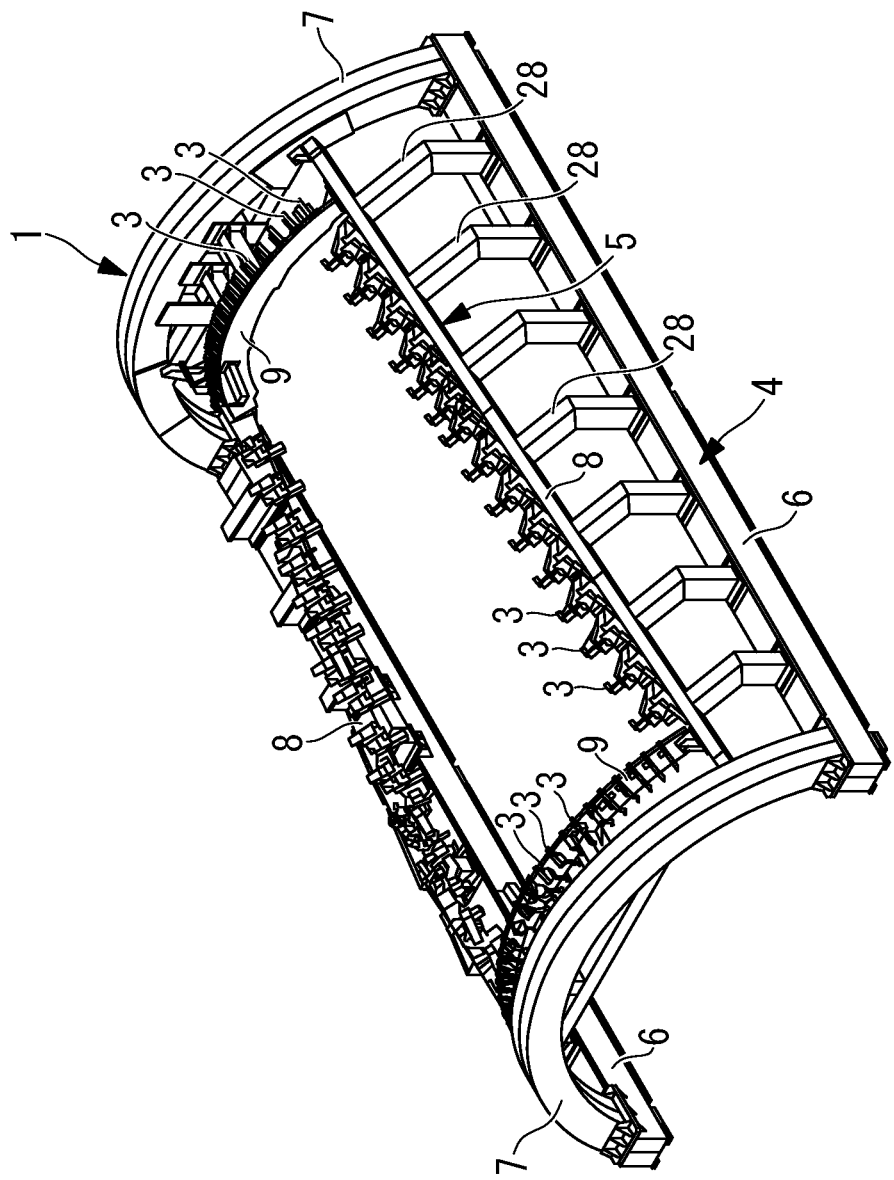
FIG. 2 is a perspective view showing the holding fixture according to the first embodiment of the present invention.

As shown in FIG. 1 and FIG. 2, the holding fixture 1 according to this embodiment includes a frame member 4, the support member 5, the gripping units 3 and the like. When the fuselage panel 10 is held by the holding fixture 1, the fuselage panel 10 is held so as to project upward.

The frame member 4 is formed of: the two straight horizontal members 6 which extend in one direction; two arch members 7 which are disposed between the two horizontal members 6, and formed into an arch shape; and other elements. The horizontal members 6 and the arch members 7 of the frame member 4 support the support member 5 described later.

The horizontal members 6 are arranged so as to extend along the axial direction of the fuselage panel 10 to be set on the holding fixture 1, for example, to extend parallel to the axial direction of the fuselage panel 10. Lower edges of the arch members 7 are joined to end portions at one end of the horizontal members 6 and to end portions at the other end of the horizontal members 6. With such a configuration, the holding fixture 1 has a substantially saddle shape formed of the two horizontal members 6 and the two arch members 7.

In the holding fixture 1 of this embodiment, end portions at one end of the two horizontal members 6 are joined, and the end portions at the other end of the two horizontal members 6 are joined. Cross beam members which extend in the direction perpendicular to the horizontal members 6 are not provided to the holding fixture 1. With such a configuration, in a state where the fuselage panel 10 is set on the holding fixture 1, it is possible to ensure a work space which extends along the axial direction below the fuselage panel 10 without being interrupted by the cross beam members.

The length of the horizontal members 6 is set longer than the length in the axial direction of the fuselage panel 10 to be manufactured by rivet fastening. An arrangement interval between the two horizontal members 6 is set longer than the arc length of the fuselage panel 10 to be manufactured by rivet fastening.

Each arch member 7 has a curved shape, and forms the frame member 4. The arch member 7 is arranged in a plane in the direction perpendicular to the axial direction of the fuselage panel 10 to be set on the holding fixture 1. One arch member 7 is provided to ends on one side of the horizontal members 6, and another arch member 7 is provided to ends on the other side of the horizontal members 6. The arch members 7 are joined to the two horizontal members 6. Accordingly, the frame member 4 has a configuration where the horizontal members 6 and the arch members 7 are formed into an integral body. The curved shape of the arch members 7, for example, the curvature of the arch members 7 is set substantially corresponding to the curvature of the fuselage panel 10 to be manufactured.

The support member 5 is formed of: two straight lower edge support members 8 which extend in the axial direction; two side edge support members 9 which are disposed between the two lower edge support members 8, and are formed into an arch shape; and other elements.

The lower edge support members 8 support lower edges of the fuselage panel 10 by means of the gripping units 3. The lower edge support members 8 are positioned above the horizontal members 6 of the frame member 4. The lower edge support members 8 are arranged so as to extend along the axial direction of the fuselage panel 10 to be set on the holding fixture 1, for example, to extend in the direction parallel or oblique to the axial direction of the fuselage panel 10. The lower edge support members 8 are respectively arranged corresponding to two opposite sides of the fuselage panel 10 to be set on the holding fixture 1. For example, the lower edge support members 8 are arranged so as to extend along straight edge portions on two opposite sides of the fuselage panel 10.

For example, assume a case where the fuselage panel 10 to be manufactured has a single curved surface with a constant curvature along the axial direction. In such a case, the extending direction of the lower edge support members 8 and the extending direction of the horizontal members 6 are parallel to each other. On the other hand, assume a case where the fuselage panel 10 to be manufactured has a double curved surface with a varying curvature along the axial direction. In such a case, the extending direction of the lower edge support members 8 extends oblique with respect to the extending direction of the horizontal members 6.

Each lower edge support member 8 is supported by the horizontal member 6 by way of auxiliary members 28 disposed between the lower edge support member 8 and the horizontal member 6, for example. The auxiliary member 28 is a member having one end portion thereof connected to the horizontal member 6, and the other end portion thereof connected to the lower edge support member 8. The plurality of auxiliary members 28 are arranged along the longitudinal direction of the horizontal member 6 and the lower edge support member 8.

The plurality of gripping units 3 are arranged on the lower edge support member 8 at intervals. The length of the lower edge support member 8 is set longer than the length in the axial direction of the fuselage panel 10 to be manufactured. An arrangement interval between the two lower edge support members 8 is set longer than the arc length of the fuselage panel 10 to be manufactured. Further, the lower edge support members 8 are positioned below the fuselage panel 10 to be held so as to allow the gripping units 3 to support the lower edge portions of the fuselage panel 10 from below.

Lower ends of the side edge support members 9 are joined to one end portions and the other end portions of the lower edge support members 8 in the longitudinal direction.

The side edge support members 9 support side edges of the fuselage panel 10 by means of the gripping units 3. Each side edge support member 9 is a member having a curved shape. The side edge support member 9 is arranged in a plane in the direction perpendicular to the axial direction of the fuselage panel 10 to be set on the holding fixture 1. The side edge support members 9 are respectively arranged corresponding to two opposite sides of the fuselage panel 10 to be set on the holding fixture 1.

One side edge support member 9 is provided to ends on one side of the lower edge support members 8 in the longitudinal direction, and another side edge support member 9 is provided to ends on the other side of the lower edge support members 8 in the longitudinal direction. The side edge support members 9 are joined to the two lower edge support members 8. Accordingly, the support member 5 has a configuration where the lower edge support members 8 and the side edge support members 9 are formed into an integral body. The curved shape of the side edge support members 9, for example, the curvature of the side edge support members 9 is set according to the curvature of the fuselage panel 10 to be manufactured. A plurality of gripping units 3 having substantially the same configuration as the above-mentioned gripping units 3 may be provided to the side edge support members 9, and the gripping units 3 may grip and support the side edges of the fuselage panel 10.

At this point of operation, the plurality of gripping units 3 mounted on each side edge support member 9 are disposed at intervals at positions which correspond to the curvature of the fuselage panel 10 to be manufactured. Accordingly, when the plurality of gripping units 3 grip the fuselage panel 10, the fuselage panel 10 gripped by the gripping units 3 is held so as to have the curvature of the fuselage panel 10 to be manufactured.

For example, assume a case where the fuselage panel 10 to be manufactured has a single curved surface with a constant curvature along the axial direction. In such a case, the curvature obtained by connecting the gripping units 3 on the side edge support member 9 on one edge side is equal to the curvature obtained by connecting the gripping units 3 on the side edge support member 9 on the other edge side. On the other hand, assume a case where the fuselage panel 10 to be manufactured has a double curved surface with a varying curvature along the one-axis direction. In such a case, the curvature obtained by connecting the gripping units 3 on the side edge support member 9 on one edge side is larger than the curvature obtained by connecting the gripping units 3 on the side edge support member 9 on the other edge side.

Next, a shape holding fixture 2 which is used in combination with the above-mentioned holding fixture 1 is described.

Figure 12:
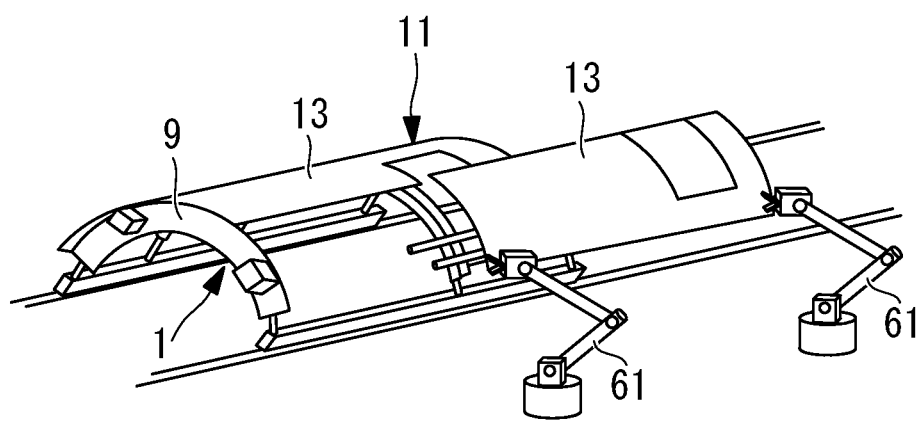
FIG. 12 is a schematic perspective view showing the holding fixture according to the first embodiment of the present invention and divided-panel mounting robots.

The shape holding fixture 2 is used when a plurality of divided panels 13 are placed on the holding fixture 1 by divided panel mounting robots 61 in a divided panel mounting space as shown in FIG. 12.

Figure 7:
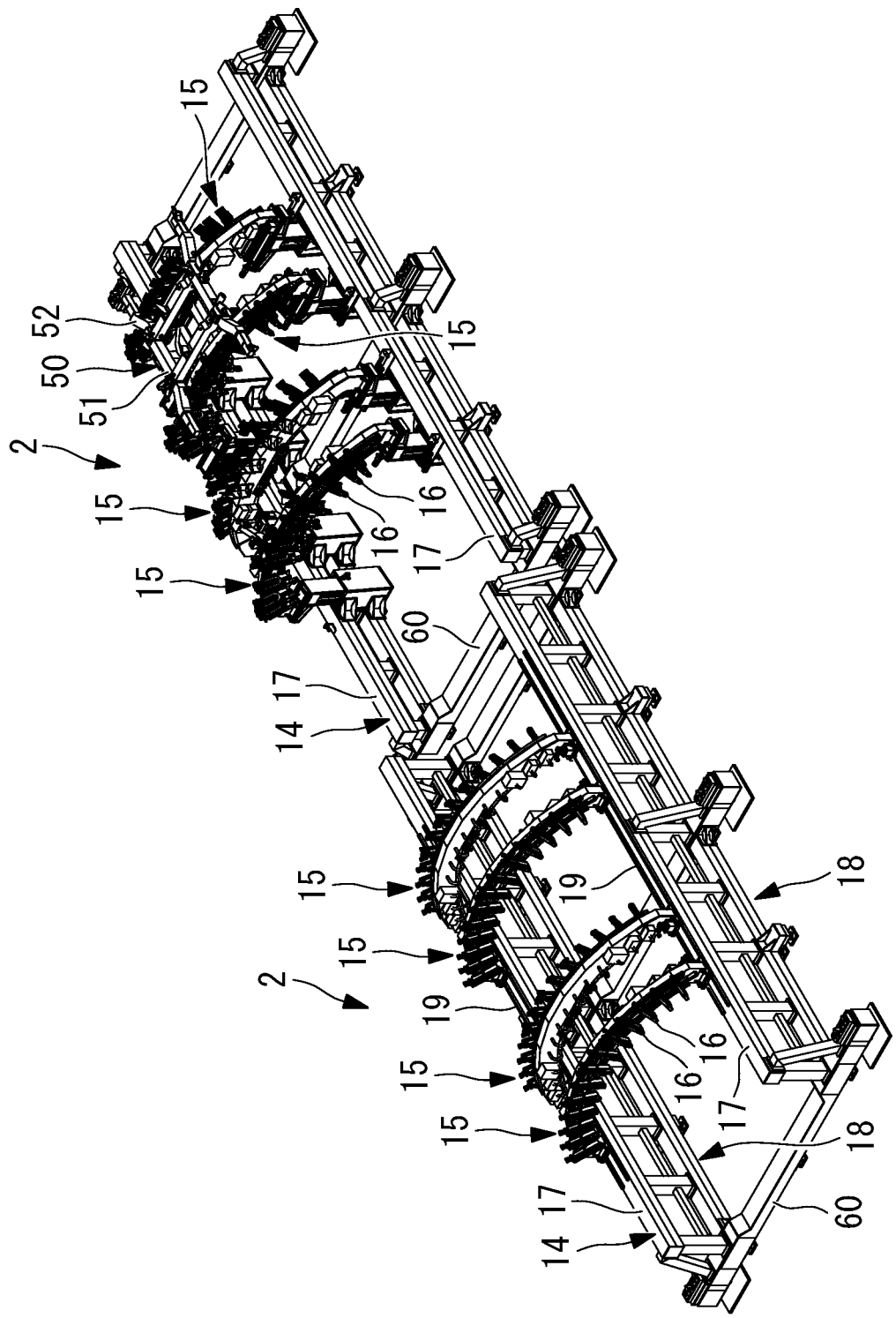
FIG. 7 is a perspective view showing the shape holding fixtures according to the first and second embodiments of the present invention.
Figure 8:
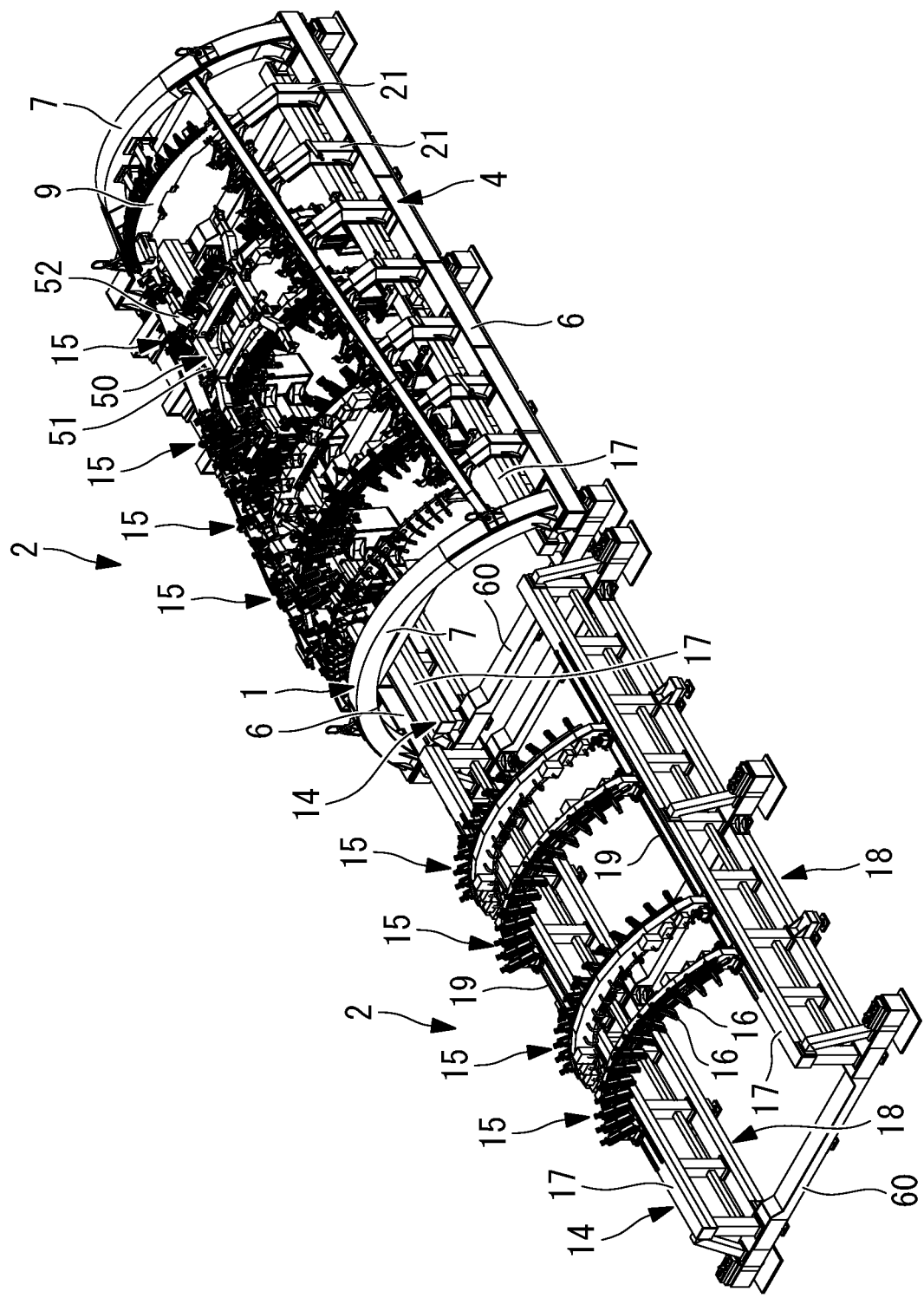
FIG. 8 is a perspective view showing the shape holding fixtures according to the first and second embodiments of the present invention.

That is, the shape holding fixture 2 is placed on the fixing base 60 in the divided panel mounting space, and is set below the holding fixture 1. FIG. 7 and FIG. 8 show the case where two shape holding fixtures 2 are arranged in series, and the shape holding fixture 2 shown on the right side in FIG. 8 is in a state where the holding fixture 1 and the shape holding fixture 2 are vertically arranged. The shape holding fixture 2 supports the fuselage panel 10 from the lower surface side, thus holding the shape of the fuselage panel 10. The shape holding fixture 2 shown on the right side in FIG.

7 and FIG. 8 is provided with a reinforcing member support unit 50 in a second embodiment described later.

The divided panel 13 is a member before the fuselage panel 10 is fastened by riveting, and is a member obtained by dividing the fuselage panel 10 into a plurality of elements. The divided panels 13 are members which extend in the direction parallel to the axial direction, for example, and obtained by dividing the fuselage panel 10 into a plurality of elements in the circumferential direction. The divided panels 13 are members obtained by dividing the fuselage panel 10 into four elements in the circumferential direction, for example.

Figure 6:
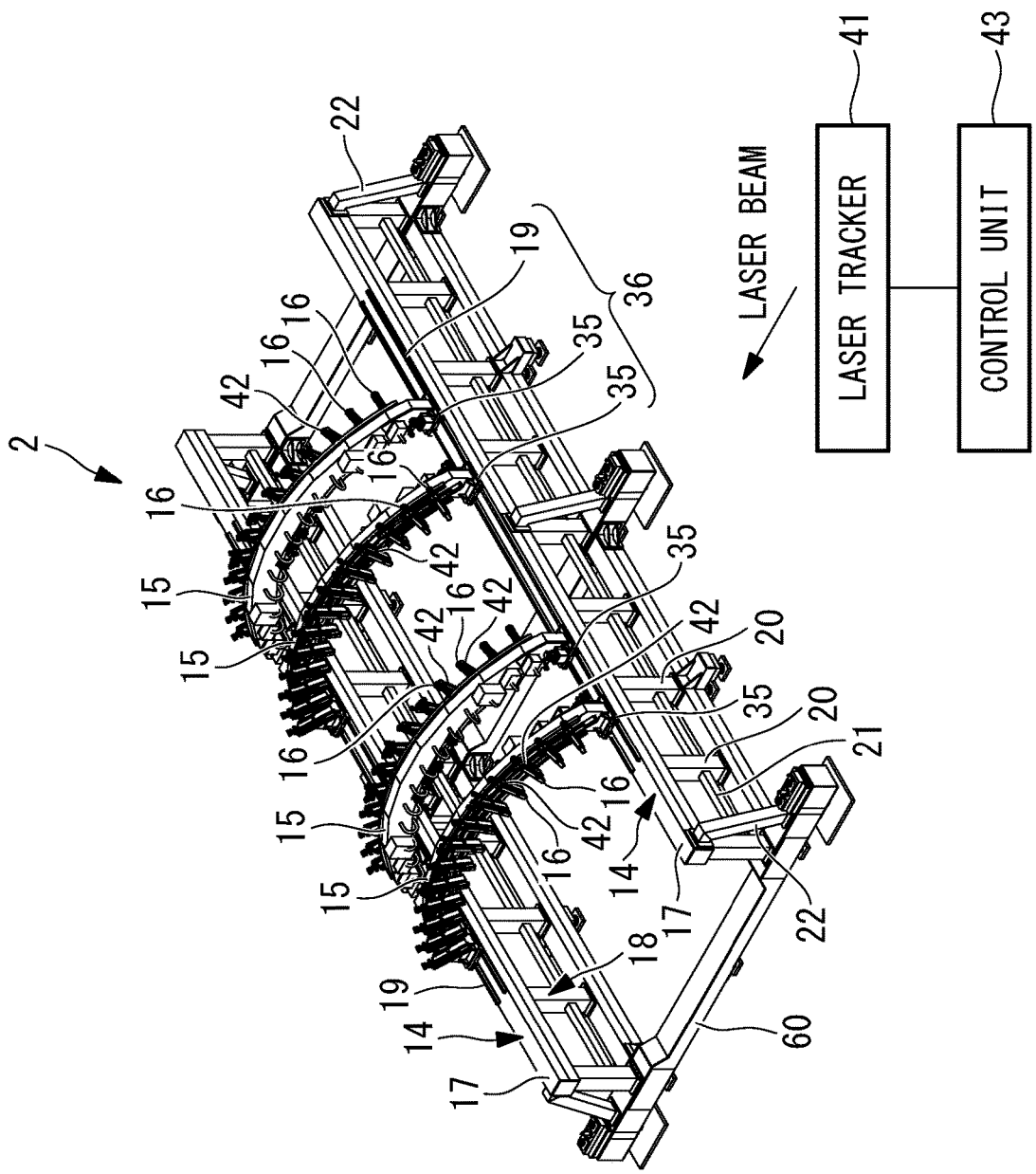
FIG. 6 is a perspective view showing a shape holding fixture according to the first embodiment of the present invention.

As shown in FIG. 6, the shape holding fixture 2 according to this embodiment includes a pedestal unit 14, support units 15, shape holding units 16, and other elements.

The pedestal unit 14 includes: two horizontal members 17 which are arranged so as to extend along the axial direction of the fuselage panel 10 to be set on the holding fixture 1, for example, to extend parallel to the axial direction of the fuselage panel 10; a structural body 18 which supports the horizontal members 17; and other elements.

Each horizontal member 17 of the pedestal unit 14 is formed of an elongated member having an upper surface thereof horizontal to an installation surface. In this embodiment, the installation surface is a surface on which the holding fixture 1 and the shape holding fixture 2 are installed. The two horizontal members 17 extend parallel to each other. The horizontal members 17 are supported by the structural body 18. The plurality of support units 15 are installed on upper surfaces of the horizontal members 17 of the pedestal unit 14. Rails 19 are also formed on the upper surfaces of the horizontal members 17, and the rails 19 allow the support units 15 to move along the axial direction, that is, along the longitudinal direction of the horizontal members 17. Traveling units 35 which travel on the rails 19 are provided on lower surfaces of each support unit 15. The rails 19 and the traveling units 35 form an axial direction adjusting unit 36.

The structural body 18 of the pedestal unit 14 is erected in the vertical direction from an upper surface of the fixing base 60. The structural body 18 includes a plurality of column members 20 arranged at intervals along the axial direction, cross beam members 21 which join the plurality of column members 20, diagonal members 22 which are arranged so as to extend in the oblique direction, and other elements. The structural body 18 is not limited to the illustrated example. The structural body 18 may have another configuration provided that the structural body 18 can support the weight of the support units 15 placed on the pedestal unit 14, and a portion of weight of the fuselage panel 10 transferred through the support units 15.

Lower ends of the support units 15 are placed on a track on the upper surfaces of the horizontal members 17. With such a configuration, the shape holding fixture 2 has a substantially saddle shape formed of the two horizontal members 17 and the plurality of support units 15.

In the shape holding fixture 2 of this embodiment, end portions at one end of the two horizontal members 17 are joined, and the end portions at the other end of the two horizontal members 17 are joined. In the same manner as the holding fixture 1, cross beam members which extend in the direction perpendicular to the horizontal members 17 are not provided to the shape holding fixture 2. With such a configuration, in a state where the fuselage panel 10 is set on the holding fixture 1, it is possible to ensure a work space which extends along the axial direction below the fuselage panel 10 without being interrupted by the cross beam members.

The length of the horizontal members 17 is set longer than the length in the axial direction of the fuselage panel 10 to be manufactured by rivet fastening. An arrangement interval between the two horizontal members 17 is set longer than the arc length of the fuselage panel 10 to be manufactured by rivet fastening.

Each support unit 15 is formed of a member having an arc shape. The support unit 15 is arranged in a plane in the direction perpendicular to the axial direction of the fuselage panel 10 to be set on the holding fixture 1. With respect to the support unit 15, four support units 15 are provided to the upper surfaces of the horizontal members 17 for one fuselage panel 10 in the example shown in FIG. 6. The curved shape of the support unit 15, for example, the curvature of the support unit 15 is set substantially corresponding to the curvature of the fuselage panel 10 to be manufactured.

The intervals of the plurality of support units 15 are determined corresponding to the size and shape of the fuselage panel 10 to be held.

The plurality of shape holding units 16 are provided to each support unit 15 at intervals along the circumferential direction. The shape holding units 16 support the fuselage panel 10 from below. Supporting the fuselage panel 10 by the plurality of shape holding units 16 allows the fuselage panel 10 to be held in a shape which is to be formed at the time of completion, when a temporary fastening operation is performed to make the divided panels 13 overlap each other. The shape holding unit 16 is configured to come into contact with a lower surface of the fuselage panel 10, and the position of an upper surface of the shape holding unit 16 which supports the fuselage panel 10 is adjustable.

The shape holding unit 16 is formed of a rod 23, a radial direction adjusting unit 24, a circumferential direction adjusting unit 25, and other elements, for example.

The radial direction adjusting unit 24 adjusts the projection length of the rod 23 along the radial direction of the fuselage panel 10 (the direction perpendicular to the axial direction). The circumferential direction adjusting unit 25 adjusts the position of the rod 23 along the circumferential direction of the fuselage panel 10. By combining the adjustment performed by the radial direction adjusting units 24 and the adjustment performed by the circumferential direction adjusting units 25, the upper surfaces of the plurality of rods 23 (projecting end portions of the rods) can be moved so as to have the shape of the fuselage panel 10 required to be held. The fuselage panel 10 is placed on the upper surfaces of the plurality of rods 23 after the positions of the upper surfaces of the plurality of rods 23 are adjusted and hence, the fuselage panel 10 is held so as to have the curvature of the fuselage panel 10 to be manufactured.

Figure 10:
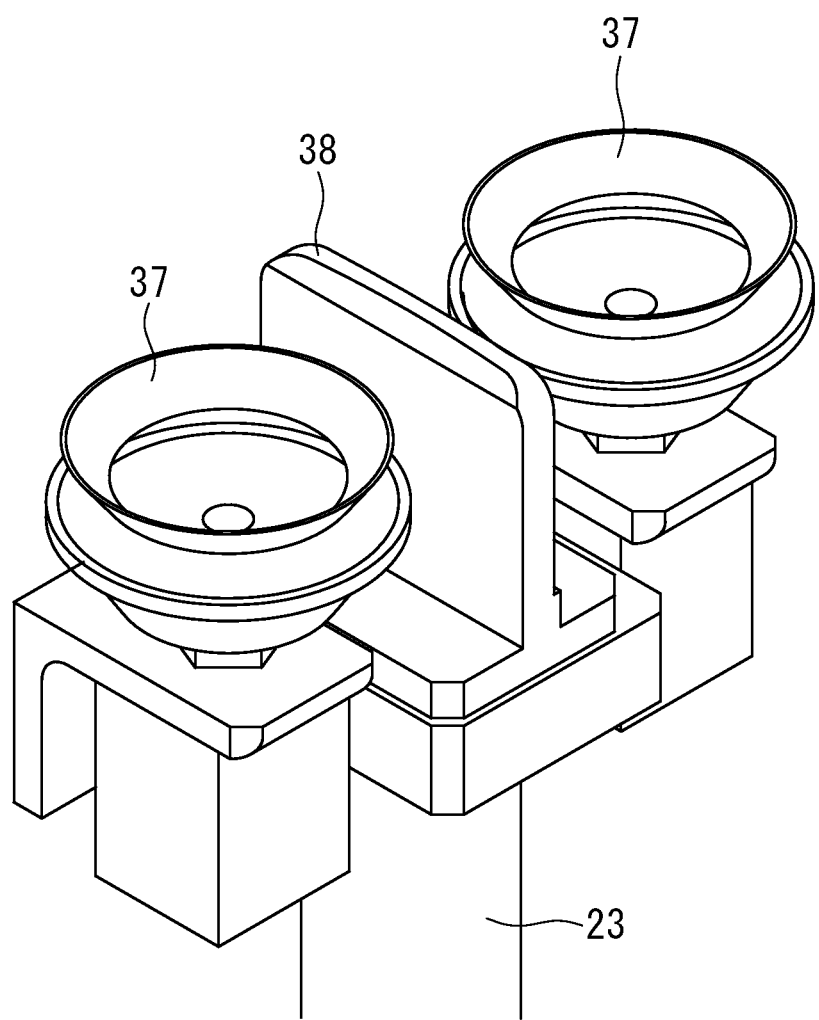
FIG. 10 is a perspective view showing a rod of the shape holding fixture according to the first embodiment of the present invention.
Figure 11:
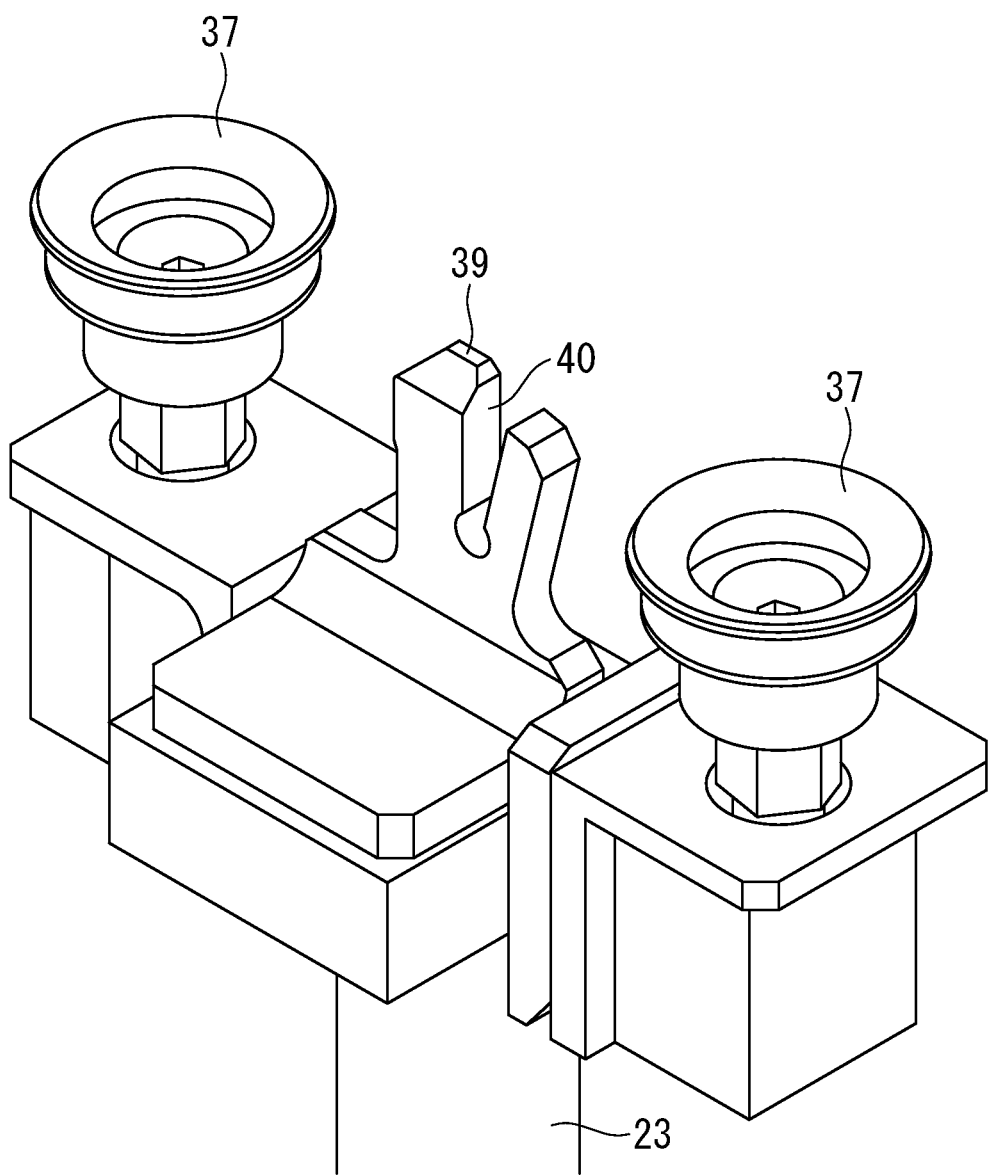
FIG. 11 is a perspective view showing a modification of the rod of the shape holding fixture according to the first embodiment of the present invention.

As shown in FIG. 10 and FIG. 11, for example, suction cups 37 are provided to a distal end of the rod 23, and the suction cups 37 come into contact with a surface of the fuselage panel 10. While the suction cup 37 is in contact with the fuselage panel 10, the space between the suction cup 37 and the surface of the fuselage panel 10 has a negative pressure so that the fuselage panel 10 is fixed to the rod 23. In the example shown in FIG. 10 and FIG. 11, two suction cups 37 are provided to the distal end of the rod 23, and a locator 38 or a locator 39 is disposed between the two suction cups 37. As shown in FIG. 10, a surface of the locator 38 which comes into contact with the fuselage panel 10 has an elongated rectangular shape. As shown in FIG. 11, the locator 39 has a surface which comes into contact with the fuselage panel 10, and a groove 40 which allows insertion of the stringer 12 therein is formed on the locator

39. Setting the stringer 12 in the groove 40 allows the fuselage panel 10 to be positioned in the circumferential direction.

Each radial direction adjusting unit 24 is formed of a hydraulic cylinder, for example. A piston rod disposed in the hydraulic cylinder corresponds to the rod 23 in this embodiment. The radial direction adjusting unit 24 is provided with the longitudinal direction thereof extending along the radial direction of the support unit 15. The radial direction adjusting unit 24 is provided to the support unit 15 with the circumferential direction adjusting unit 25 interposed therebetween.

Figure 9:
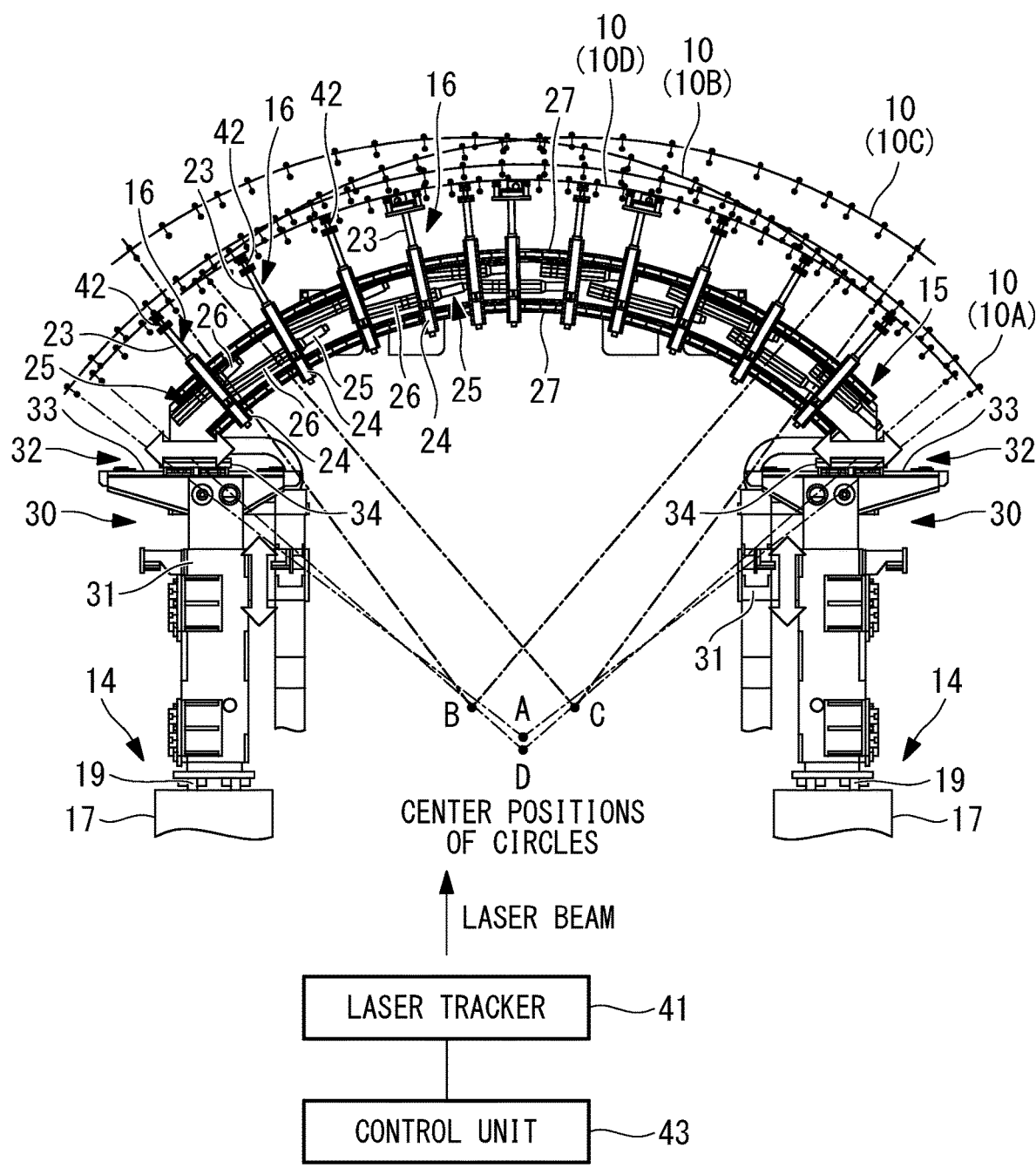
FIG. 9 is a front view showing the shape holding fixture according to the first embodiment of the present invention.

As shown in FIG. 9, each circumferential direction adjusting unit 25 includes a linear guide 26, rails 27 provided in a curved shape along the circumferential direction, and other elements, for example. The linear guide 26 is installed on a plate surface of the support unit 15 such that the longitudinal direction of a rail portion of the linear guide 26 extends parallel to the tangential direction of the circumferential direction of the support unit 15. The radial direction adjusting unit 24 is fixed to a block portion of the linear guide 26, and travels along the rail portion of the linear guide 26. In addition to the linear guide 26, one rail 27 is provided to each of the outer peripheral edge side and the inner peripheral edge side of the plate surface of the support unit 15. One end side and the other end side of the radial direction adjusting unit 24 are respectively connected to the rail 27 on the outer peripheral side and the rail 27 on the inner peripheral side so that the radial direction adjusting unit 24 can travel along the rails 27. Accordingly, moving the block portion of the linear guide 26 of the circumferential direction adjusting unit 25 allows the radial direction adjusting unit 24 and the rod 23 to move along the circumferential direction of the support unit 15.

This embodiment may include an automatic adjustment mechanism which measures the positions in the vicinity of the upper surfaces of the rods 23, and can change the positions of the upper surfaces of the rods 23 based on the measurement results.

The measurement of the positions of the upper surfaces of the rods 23 is performed by a laser tracker 41, reflectors 42 and a control unit 43, for example. The laser tracker 41 is installed at the position separated from the support unit 15, and emits a laser beam and receives the reflected beam from the reflectors 42. Each reflector 42 is provided in the vicinity of the upper surface of the rod 23. The laser tracker 41 emits a laser beam, and receives the laser beam reflected on the reflectors 42 provided to the rods 23, thus detecting the positions in the vicinity of the upper surfaces of the rods 23.

The control unit 43 drives the above-mentioned axial direction adjusting unit 36 (see FIG. 6), the radial direction adjusting units 24 (see FIG. 9), and the circumferential direction adjusting units 25 (see FIG. 9) based on detected positions in the vicinity of the upper surfaces of the rods 23. Driving these units allows the support units 15 to move in the axial direction, and allows the rods 23 to move in the circumferential direction and in the radial direction.

With such a configuration, in this embodiment, the positions of the support units 15 and the positions of the upper surfaces of the rods 23 can be varied. Performing the position detection by the laser tracker 41 and position adjustment by the circumferential direction adjusting units 25 and the radial direction adjusting units 24 enables simple and rapid position adjustment with high accuracy.

Next, a modification of the shape holding fixture 2 according to this embodiment is described.

As shown in FIG. 9, the support unit 15 may further include center position changing units 30 which can adjust the support unit 15 in the height direction and in the chordwise direction. Each center position changing unit 30 includes a height adjusting unit 31, a chordwise direction adjusting unit 32, and other elements, for example. The height adjusting unit 31 is disposed above the above-mentioned pedestal unit 14, for example, and is configured to lift and lower the support unit 15 in the vertical direction. The support unit 15 is lifted and lowered in the vertical direction by a hydraulic mechanism of the height adjusting unit 31, for example. The chordwise direction adjusting unit 32 is provided to the upper surface of the horizontal member 17 of the pedestal unit 14, for example. The chordwise direction adjusting unit 32 is formed of a rail 33, a traveling unit 34, and other elements. The rail 33 allows the support unit 15 to move in the direction perpendicular to the axial direction. The traveling unit 34 is provided to lower surfaces of each support unit 15, and travels on the rail 33.

With such a configuration, the installation position of the support unit 15 can be adjusted in the height direction and in the chordwise direction so that the center position of a circle of a cross section of the fuselage panel 10 can be varied. The height adjusting units 31 and the chordwise direction adjusting units 32 are movable together with the support unit 15 along the rails 19 on the pedestal unit 14 along the axial direction, that is, along the longitudinal direction of the horizontal members 17.

In the case where the height adjusting units 31 and the chordwise direction adjusting units 32 are provided, the control unit 43 drives the height adjusting units 31 and the chordwise direction adjusting units 32 based on the detected positions in the vicinity of the upper surfaces of the rods 23. Driving these units allows the support unit 15 to move in the height direction and in the axial direction.

With such a configuration, in this embodiment, the positions of the support units 15 can be varied. Performing the position detection by the laser tracker 41 and position adjustment by the height adjusting units 31 and the chordwise direction adjusting units 32 allows simple and rapid position adjustment with high accuracy.

Hereinafter, an application example of the shape holding fixture 2 according to this embodiment is described.

When the above-mentioned holding fixture 1 according to this embodiment holds the fuselage panel 10, first, as shown in FIG. 12, the divided panel 13 is lifted by the divided panel mounting robots 61 or the like, and the divided panel 13 is placed on a vacant holding fixture 1, on which no panel is placed, at a predetermined position of the side edge support member 9 of the holding fixture 1. At this point of operation, to hold the shape of the fuselage panel 10, the fuselage panel 10 is held from below using the shape holding fixture 2 which is a separate body from the holding fixture 1. The divided panel 13 is a member before the fuselage panel 10 is fastened by riveting, and is a member obtained by dividing the fuselage panel 10 into a plurality of elements. The divided panels 13 are members which extend in the direction parallel to the axial direction, for example, and are obtained by dividing the fuselage panel 10 into a plurality of elements in the circumferential direction. The divided panels 13 are members obtained by dividing the fuselage panel 10 into four elements in the circumferential direction, for example.

When the plurality of divided panels 13 are placed on the holding fixture 1, the skins 11 of the divided panels 13 disposed adjacent to each other are made to overlap with each other on the holding fixture 1. That is, an edge portion of the skin 11 of one divided panel 13 is placed on an edge portion of the skin 11 of the other divided panel 13. At this point of operation, the divided panel 13 is fixed by the gripping units 3 mounted on the lower edge support members 8. Then, overlapping portions of the skins 11 are temporarily fastened by rivets. The fuselage panel 10 on which temporary fastening is performed is held in a state of being fixed by the gripping units 3.

Using the shape holding fixture 2 allows the holding fixture 1, which holds the shape of the fuselage panel 10 and conveys the fuselage panel 10, to have a simplified structure. Further, using the holding fixture 1 and the shape holding fixture 2 in combination ensures shape accuracy required in the manufacturing process, thus holding the fuselage panel 10 in an appropriate shape.

The fuselage panel 10 on which the temporary fastening is performed and which is fixed by the gripping units 3 is moved to a next step in a state where the fuselage panel 10 is set on the holding fixture 1. The holding fixture 1 is moved by a conveyor positioned at a bottom portion of the holding fixture 1, for example. The shape holding fixture 2 is removed from the fuselage panel 10 when the holding fixture 1 is moved. According to this embodiment, the holding fixture 1 holds the fuselage panel 10 such that the shape of the completed fuselage panel 10 is held also in such a state.

On the fuselage panel 10 on the holding fixture 1 which is moved, rivet fastening is performed by an automatic riveting machine, or is manually performed by an operator, for example.

Figure 13:
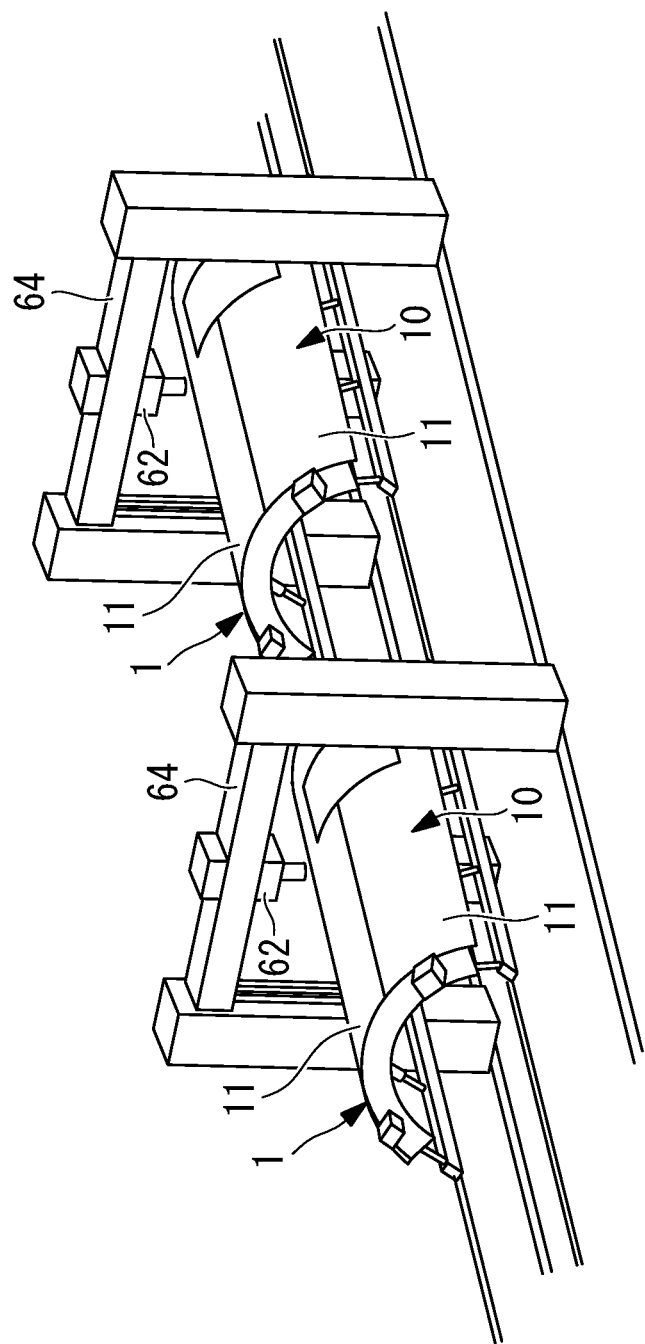
FIG. 13 is a schematic perspective view showing the holding fixture according to the first embodiment of the present invention and automatic riveting machines.
Figure 14:
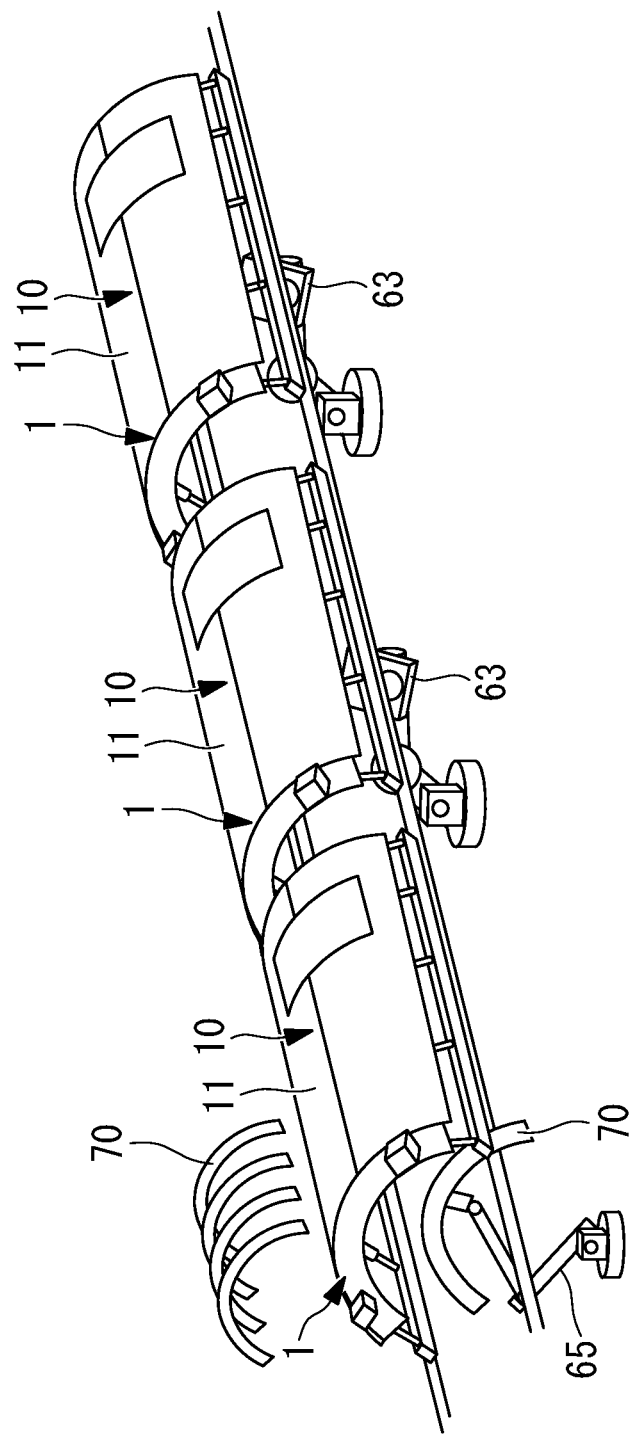
FIG. 14 is a schematic perspective view showing the holding fixture according to the first embodiment of the present invention, a frame mounting robot, and the automatic riveting machines.

A rivet fastening operation to be performed on the fuselage panel 10 placed on the holding fixture 1 includes an operation where, as shown in FIG. 13, the overlapping portions of the skins 11 disposed adjacent to each other are fastened by automatic riveting machines (for example, gate-shaped frames 64 and riveting machines 62 supported by the gate-shaped frame 64). The rivet fastening operation also includes an operation where, as shown in FIG. 14, frames 70 are temporarily fastened to the inner surface side of the fuselage panel 10, that is, to a lower surface of the skin 11 of the fuselage panel 10 supported by the holding fixture 1 and the stringers 12 by a mounting robot 65 and, thereafter, the frames 70 are fastened to the lower surface of the skin 11 and the stringers 12 by automatic riveting machines 63. In addition to the above-mentioned operations, attachment of a hinge of an aircraft door which is to be attached to the fuselage panel 10, attachment of a bracket for wiring and piping or attachment of a bracket for installing a sensor is performed through rivet fastening operations which are manually performed.

The shape holding fixture 2 according to this embodiment may be used in temporarily fastening the frames 70 to the inner surface side of the fuselage panel 10 and the stringers 12 by the mounting robot 65 as shown in FIG. 14. In this case, the shape holding fixture 2 not only can hold the shape of the fuselage panel 10 but can also be used for positioning the frames 70. That is, the support unit 15 is moved so that the plate surface of the support unit 15 of the shape holding fixture 2 is made to correspond to an installation position of the frame 70, and the mounting robot 65 mounts the frame 70 using the plate surface of the support unit 15 as a target. With such a configuration, positioning accuracy and mounting accuracy in mounting the frame 70 can be enhanced. In an actual step, the shape holding fixture 2 which is used for positioning the frame 70 is different from the shape holding fixture 2 which is used for temporarily fastening the fuselage panel 10. The respective shape holding fixtures 2 are fixed in respective processing areas without being moved.

The fuselage panel 10 where rivet fastening is completed is moved to a next step in a state where the fuselage panel 10 is set on the holding fixture 1. After the rivet fastening is completed, an adjustment is performed based on inspection or the results of inspection. The fuselage panel 10 where the inspection and the adjustment are completed is hoisted by a crane or the like, and is removed from the holding fixture 1. Thereafter, the fuselage panel 10 is placed on another fixture, and coating or the like is performed on the fuselage panel 10.

As described above, the holding fixture 1 supports the fuselage panel 10 at the edge portions of the fuselage panel 10. That is, the fuselage panel 10 having the skin 11 is gripped by the plurality of gripping units 3 at the edge portions of the fuselage panel 10 on two opposite sides (for example, two opposite sides which extend parallel to the axial direction). At this point of operation, the plurality of gripping units 3 are integrally supported by way of the support member 5 which is provided corresponding to the fuselage panel 10.

The fuselage panel 10 is held so as to have a curved shape in cross section taken in the direction perpendicular to the axial direction so that the fuselage panel 10 projects upward. The fuselage panel 10 is held from below the fuselage panel 10, for example, at the edge portions on two sides of the fuselage panel 10 and hence, the holding fixture 1 can hold the fuselage panel 10 with a simple structure. Further, the holding fixture 1 is configured to be conveyable in a state of holding the fuselage panel 10. For example, the frame member 4 and the support member 5 are formed into an integral body so that the holding fixture 1 has a shape where the bottom portions of the horizontal members 6 are disposed in the same plane. Accordingly, the holding fixture 1 can be conveyed in a state of holding the fuselage panel 10.

The holding fixture 1 has the structure of supporting the fuselage panel 10 at the edge portions of the fuselage panel 10. Accordingly, the holding fixture 1 of this embodiment is simplified and light-weighted compared to a conventional fixture where a plurality of positioning members are provided corresponding to a plurality of respective frames to be mounted on the fuselage panel 10. Accordingly, the fuselage panel 10 is movable together with the holding fixture 1 in a state where the fuselage panel 10 is held by the holding fixture 1. As a result, a rivet fasten operation may be performed by an automatic riveting machine, a rivet fasten operation may be manually performed, and inspection/an adjustment operation may be performed with respect to the fuselage panel 10 while moving the holding fixture 1 between different work locations.

Further, using the shape holding fixture 2 ensures shape accuracy of the fuselage panel 10 even when the fuselage panel 10 has low rigidity such as when the divided panels 13 are placed in an overlapping manner. Using the shape holding fixture 2 in combination with the holding fixture 1 allows the holding fixture 1 to be simplified. Further, the support units 15 and the rods 23 are configured to be movable and hence, the support units 15 and the rods 23 can cope with a variety of shapes of the fuselage panels 10. Accordingly, the shape holding fixture 2 can be widely adopted.

Second Embodiment

Next, a shape holding fixture according to a second embodiment of the present invention is described with reference to FIG. 7 and FIG. 8. A shape holding fixture 2 shown on the right side in FIG. 7 and FIG. 8 is a shape holding fixture 2 according to the second embodiment.

In the case where an opening portion is formed in the fuselage panel 10, an opening portion reinforcing member (not shown in the drawing) is provided to the inner side of the fuselage panel 10 along the opening portion. The opening portion reinforcing member is a structural body of the fuselage panel 10 for reinforcing the opening portion. The shape holding fixture 2 according to this embodiment is applicable to the case of manufacturing a fuselage panel 10 which requires the provision of the opening portion reinforcing member.

In this embodiment, the reinforcing member support unit 50 is fixed on the support units 15 in a step of placing the divided panel 13 of the fuselage panel 10 on the holding fixture 1 and the shape holding fixture 2. Then, the opening portion reinforcing member is set on the reinforcing member support unit 50 and, further, the divided panel 13 of the fuselage panel 10 is placed on the support units 15 and the opening portion reinforcing member.

The reinforcing member support unit 50 has a shape conforming to the opening portion reinforcing member. For example, the reinforcing member support unit 50 is formed of a frame portion 51 having a quadrangular shape, rod-shaped projecting portions 52 which project outward from the frame portion 51, and other elements. The reinforcing member support unit 50 is fixed to the support units 15 by clamps or the like installed on the support units 15. Clamps or the like are provided to the reinforcing member support unit 50 so as to be joined to the opening portion reinforcing member. In a state where the reinforcing member support unit 50 is fixed to the support units 15, the reinforcing member support unit 50 supports the opening portion reinforcing member from below.

In fixing the reinforcing member support unit 50 to the support units 15, the reinforcing member support unit 50 may interfere with a rod 23 of a shape holding unit 16 provided to the support unit 15. In this case, it is sufficient to reduce the projection length of the rod 23, and to allow the rod 23 to retract to the position which does not interfere with the reinforcing member support unit 50.

Next, a method for manufacturing the fuselage panel 10 using the shape holding fixture 2 according to this embodiment is described.

First, an opening portion reinforcing member is set on the reinforcing member support units 50 using clamps provided to the reinforcing member support units 50. Thereafter, the reinforcing member support units 50 to which the opening portion reinforcing member is set is conveyed to a position above the support units 15, and the reinforcing member support unit 50 is set on the support units 15 using the clamps provided to the support units 15. Thereafter, the divided panel 13 is placed on the holding fixture 1 and the shape holding fixture 2 at a predetermined position by divided panel mounting robots 61 or the like. In such a state, a rivet fastening is manually performed on the divided panel 13 of the fuselage panel 10 and the opening portion reinforcing member by an operator, for example. Accordingly, the opening portion reinforcing member is joined to the divided panel 13. After the opening portion reinforcing member is fastened to the divided panel 13, the opening portion reinforcing member is removed from the reinforcing member support unit 50.

In the above-mentioned first and second embodiments, the description has been made with respect to the case where the shape holding fixture 2 is used in performing rivet fastening on the fuselage panel 10. However, an operation to which the shape holding fixture 2 is applicable is not limited to the above-mentioned example. For example, the shape holding fixture 2 may be used for correcting the shape of the fuselage panel 10 in the middle of the manufacturing process of a fuselage panel.

Further, in the above-mentioned embodiment, the description has been made with respect to the case where the shape holding fixture 2 is fixed at a work area. However, the present invention is not limited to such an example. The shape holding fixture 2 may be configured to be movable between work areas together with the holding fixture 1.

Still further, the fixing base 60 is not limited to the above-mentioned example. The fixing base 60 may have the structure where the fixing base 60 is movable or some members of the fixing base 60 are removable so as to prevent interference with an automatic riveting machine.

The invention claimed is:

1. A method for manufacturing an aircraft panel including a plate-like member, the method comprising the steps of:
   conveying a holding fixture to a position above a shape holding fixture;
   setting the holding fixture on the shape holding fixture in an overlapping manner;
   causing a plurality of gripping units provided to the holding fixture to grip an aircraft panel including the plate-like member, at edge portions on two opposite sides of the aircraft panel on the holding fixture such that the aircraft panel has a curved shape in cross section taken in a direction perpendicular to a one-axis direction;
   adjusting positions of rods conforming to a shape of the aircraft panel, the rods being provided to a plurality of support units of the shape holding fixture which are arranged at intervals along the one-axis direction;
   causing the rods to come into contact with the aircraft panel from a lower surface side of the aircraft panel so as to support the aircraft panel;
   joining an overlapping portion of the aircraft panel by a rivet; and
   conveying the holding fixture while maintaining a state where the holding fixture holds the edge portions of the aircraft panel.

\* \* \* \* \*